(12) United States Patent
Denbo et al.

(10) Patent No.: US 10,086,722 B2
(45) Date of Patent: Oct. 2, 2018

(54) CHILD RESTRAINT

(71) Applicant: DOREL JUVENILE GROUP, INC., Foxboro, MA (US)

(72) Inventors: Sean R. Denbo, Columbus, IN (US); Mei-Hui Lin, Nashville, IN (US); Kyle M. Franke, Columbus, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 58 days.

(21) Appl. No.: 15/339,128

(22) Filed: Oct. 31, 2016

(65) Prior Publication Data
US 2017/0190269 A1 Jul. 6, 2017

Related U.S. Application Data

(60) Provisional application No. 62/248,623, filed on Oct. 30, 2015, provisional application No. 62/248,597, filed on Oct. 30, 2015.

(51) Int. Cl.
B60N 2/26 (2006.01)
B60N 2/28 (2006.01)

(52) U.S. Cl.
CPC .......... B60N 2/2884 (2013.01); B60N 2/2821 (2013.01); B60N 2/2875 (2013.01)

(58) Field of Classification Search
CPC ... B60N 2/2884; B60N 2/2875; B60N 2/2821
USPC .......................... 297/216.11, 256.13, 256.16
See application file for complete search history.

(56) References Cited

U.S. PATENT DOCUMENTS

| | | | |
|---|---|---|---|
| 4,545,617 A * | 10/1985 | Drexler | B60N 2/286 297/256.13 |
| 4,816,205 A | 3/1989 | Gallix | |
| 5,236,221 A * | 8/1993 | Minami | B60N 2/28 297/256.13 X |
| 5,462,333 A * | 10/1995 | Beauvais | B60N 2/2821 297/216.11 |
| 5,746,478 A | 5/1998 | Lumley et al. | |
| 5,836,650 A | 11/1998 | Warner et al. | |
| 6,000,753 A | 12/1999 | Cone | |
| 6,139,101 A | 10/2000 | Berringer et al. | |
| 6,199,949 B1 | 3/2001 | DaSilva | |
| 6,299,249 B1 | 10/2001 | Mori | |
| 6,375,260 B1 | 4/2002 | Hiramatsu et al. | |
| 6,386,632 B1 * | 5/2002 | Goor | B60N 2/2806 297/216.11 X |
| 6,428,100 B1 | 8/2002 | Kain et al. | |
| 6,454,350 B1 * | 9/2002 | Celestina-Krevh | B60N 2/2821 297/216.11 |
| 6,505,887 B2 | 1/2003 | Hampton | |
| 6,554,358 B2 | 4/2003 | Kain | |
| 6,572,189 B1 | 6/2003 | Blaymore | |
| 6,626,493 B2 | 9/2003 | Kain | |
| 6,669,288 B2 * | 12/2003 | Nakagawa | B60N 2/2821 297/216.11 |
| 6,908,151 B2 | 6/2005 | Meeker et al. | |
| 6,921,133 B2 * | 7/2005 | Taoka | B60N 2/2803 297/216.11 |

(Continued)

Primary Examiner — Rodney B White
(74) Attorney, Agent, or Firm — Barnes & Thornburg LLP

(57) ABSTRACT

A child restraint including a tiltable juvenile vehicle seat and a seat support underlying the tiltable juvenile vehicle seat is provided. The tiltable juvenile vehicle seat is coupled to the seat support and configured to move relative to the seat support.

14 Claims, 16 Drawing Sheets

(56) References Cited

U.S. PATENT DOCUMENTS

| | | | |
|---|---|---|---|
| 7,059,677 B2 | 6/2006 | Balensiefer et al. | |
| 7,073,859 B1* | 7/2006 | Wilson | B60N 2/0232 |
| | | | 297/256.13 X |
| 7,090,294 B2* | 8/2006 | Balensiefer, II | B60N 2/2806 |
| | | | 297/256.13 |
| 7,219,958 B2* | 5/2007 | Yamazaki | B60N 2/2806 |
| | | | 297/216.11 |
| 7,461,893 B2* | 12/2008 | Maciejczyk | B60N 2/2806 |
| | | | 297/216.11 |
| 7,472,955 B2 | 1/2009 | Crane et al. | |
| 7,484,801 B2* | 2/2009 | Kassai | B60N 2/2806 |
| | | | 297/256.13 |
| 7,658,446 B2* | 2/2010 | Meeker | B60N 2/2812 |
| | | | 297/256.13 X |
| 8,459,739 B2* | 6/2013 | Tamanouchi | B60N 2/2806 |
| | | | 297/256.13 X |
| 8,585,143 B2* | 11/2013 | Xiao | B60N 2/2875 |
| | | | 297/256.13 |
| 8,840,184 B2* | 9/2014 | Szakelyhidi | B60N 2/2806 |
| | | | 297/256.13 X |
| 8,998,318 B2 | 4/2015 | Gaudreau, Jr. | |
| 2002/0145319 A1* | 10/2002 | Tsugimatsu | B60N 2/2806 |
| | | | 297/256.13 |
| 2002/0175544 A1* | 11/2002 | Goor | B60N 2/2806 |
| | | | 297/216.11 |
| 2005/0168025 A1* | 8/2005 | Kespohl | B60N 2/2803 |
| | | | 297/256.13 |
| 2007/0057546 A1* | 3/2007 | Chen | B60N 2/286 |
| | | | 297/256.13 |
| 2009/0072600 A1* | 3/2009 | Van der Vegt | B60N 2/2827 |
| | | | 297/256.13 |
| 2009/0302647 A1* | 12/2009 | Przybylo | B60N 2/2821 |
| | | | 297/216.11 |
| 2011/0109138 A1* | 5/2011 | Inoue | B60N 2/2806 |
| | | | 297/256.13 |
| 2011/0227376 A1* | 9/2011 | Franck | B60N 2/2809 |
| | | | 297/216.11 |
| 2012/0313413 A1 | 12/2012 | Hutchinson et al. | |
| 2013/0175832 A1* | 7/2013 | Cheng | B60N 2/2821 |
| | | | 297/216.11 |
| 2014/0035333 A1* | 2/2014 | Cheng | B60N 2/2884 |
| | | | 297/216.11 |
| 2014/0117729 A1* | 5/2014 | Allen | B60N 2/4235 |
| | | | 297/216.11 |
| 2014/0232152 A1* | 8/2014 | Minato | B60N 2/2809 |
| | | | 297/216.11 |
| 2014/0354021 A1* | 12/2014 | Sedlack | B60N 2/2821 |
| | | | 297/216.11 |
| 2014/0368009 A1* | 12/2014 | Haut | A47D 1/006 |
| | | | 297/256.13 |
| 2016/0039319 A1* | 2/2016 | Zhang | B60N 2/2851 |
| | | | 297/216.11 |
| 2016/0082865 A1* | 3/2016 | Zhou | B60N 2/2809 |
| | | | 297/216.11 |
| 2016/0114706 A1* | 4/2016 | Hutchinson | B60N 2/2821 |
| | | | 297/256.13 |
| 2016/0144752 A1* | 5/2016 | Frank | B60N 2/2803 |
| | | | 297/216.11 |
| 2016/0176320 A1* | 6/2016 | Williams | B60N 2/2821 |
| | | | 297/256.13 |

* cited by examiner

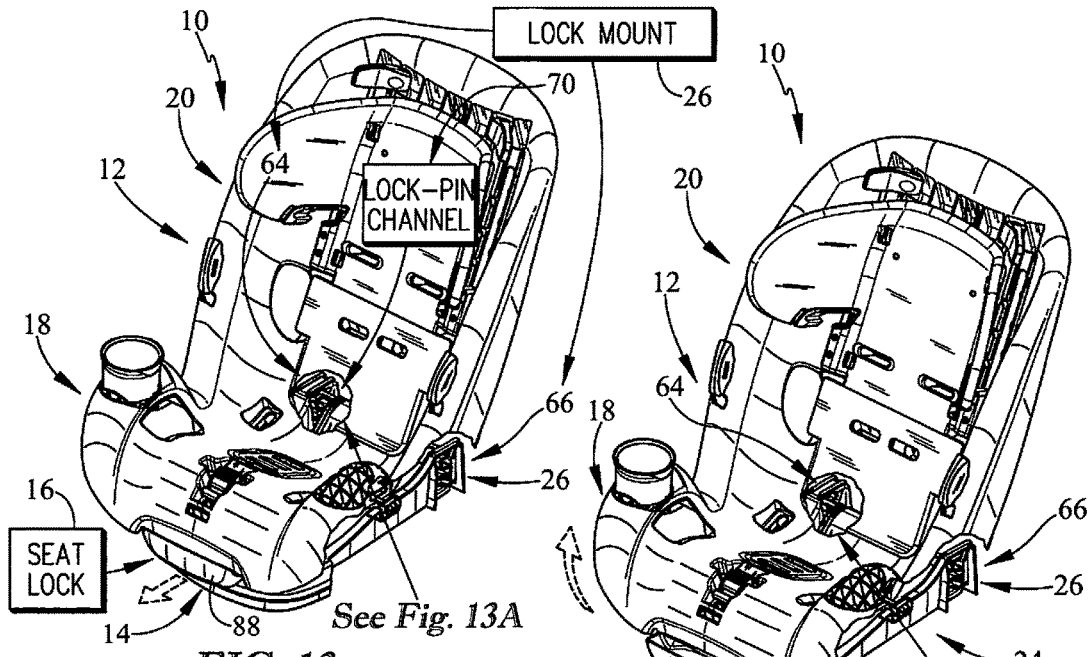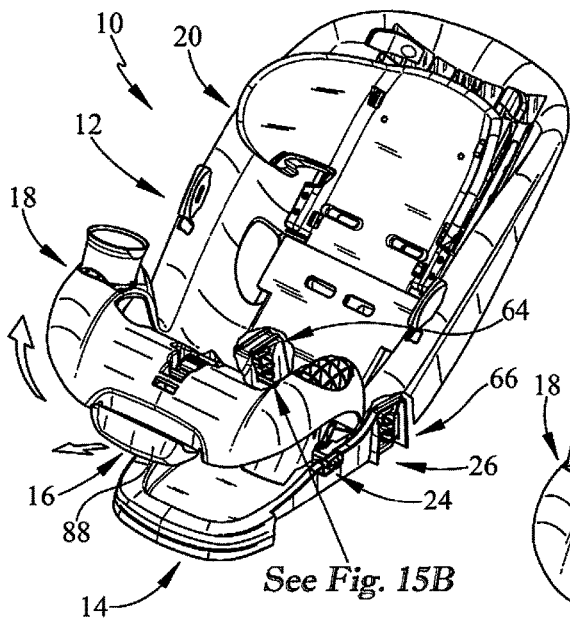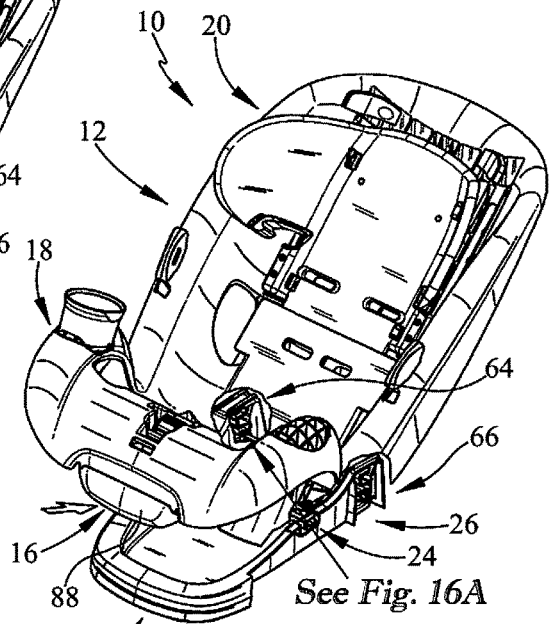

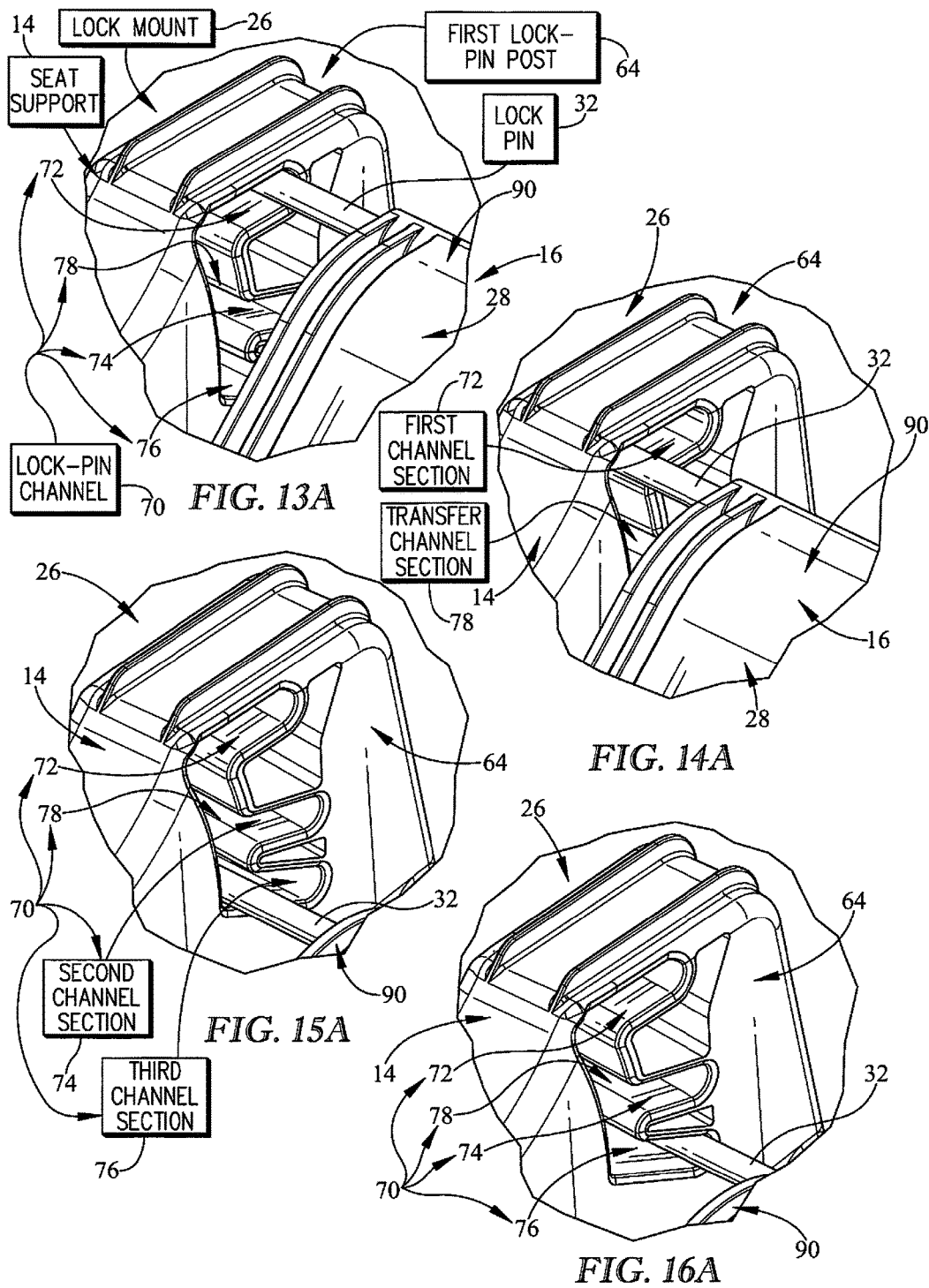

CHILD RESTRAINT

PRIORITY CLAIM

This application claims priority under 35 U.S.C. § 119(e) to U.S. Application No. 62/248,623 filed Oct. 30, 2015 and U.S. Application No. 62/248,597 filed Oct. 30, 2015, each of which is expressly incorporated by reference herein.

BACKGROUND

The present disclosure relates to a child restraint, and particularly, to a child restraint including a juvenile vehicle seat and seat support. More particularly, the present disclosure relates to a juvenile vehicle seat that is movable relative to the seat support.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in g's.

SUMMARY

According to the present disclosure, a child restraint includes a tiltable juvenile vehicle seat and a seat support underlying the tiltable juvenile vehicle seat. The tiltable juvenile vehicle seat includes a seat bottom and a seat back extending upwardly away from the seat bottom.

In illustrative embodiments, the tiltable juvenile vehicle seat is coupled to the seat support to cause a front end of the tiltable juvenile vehicle seat to be cantilevered above a front of the seat support. When an external force is applied to the child restraint during an impact event, the seat support deforms in a controlled manner to absorb energy from the impact event so that g's measured at a chest of a child restrained by the child restraint are minimized during the impact event.

In illustrative embodiments, a rear portion of the tiltable juvenile vehicle seat is coupled to a rear portion of the seat support by a lock pin. The lock pin is arranged to extend through lock-pin receiving slots formed in the tiltable juvenile vehicle seat and through the seat support. As a result, the lock pin is constrained to move with the tiltable juvenile vehicle seat. The lock pin is also able to move back and forth in the lock-pin receiving slots relative to the tiltable juvenile vehicle seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is an exploded assembly view of a child restraint in accordance with the present disclosure showing that the child restraint includes, from top to bottom, a tiltable juvenile vehicle seat including a seat bottom and a seat back extending upwardly away from the seat bottom, a seat lock including a seat-motion blocker arranged to be moved between a retracted position and an extended position relative to the seat support to free a tiltable juvenile vehicle seat for pivotable movement about a pivot axis extending through a pivot pin relative to the seat support, a pivot pin configured to couple pivotably the tiltable juvenile vehicle seat to the seat lock and to the seat support, a lock pin, and a bias member, and a seat support including a support foundation arranged to set on a passenger seat of a vehicle, a pivot mount arranged to receive the pivot pin, and a lock mount arranged to receive the lock pin;

Figure 3:
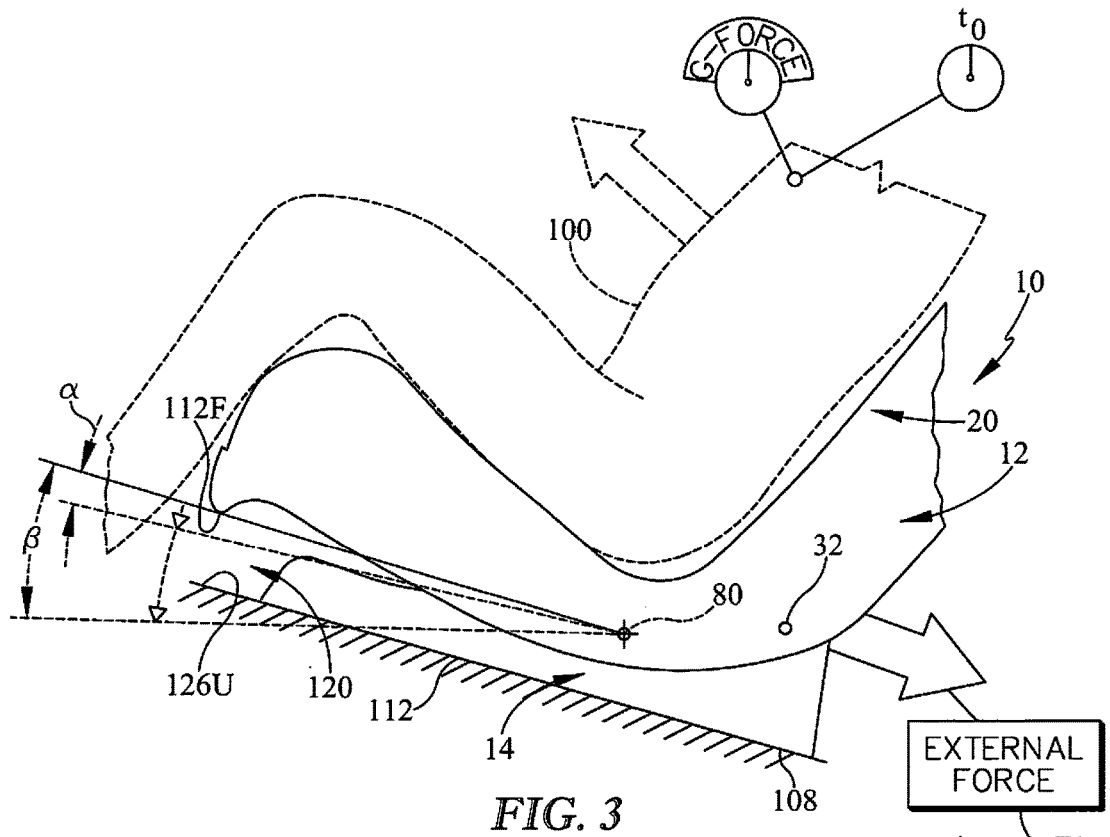
FIGS. 3-5 are a series of diagrammatic views showing a child restraint in accordance with the present disclosure deforming in response to application of an external force caused by an impact event being applied to the child restraint so that g's measured at a chest of a child are minimized during the impact event.
Figure 4:
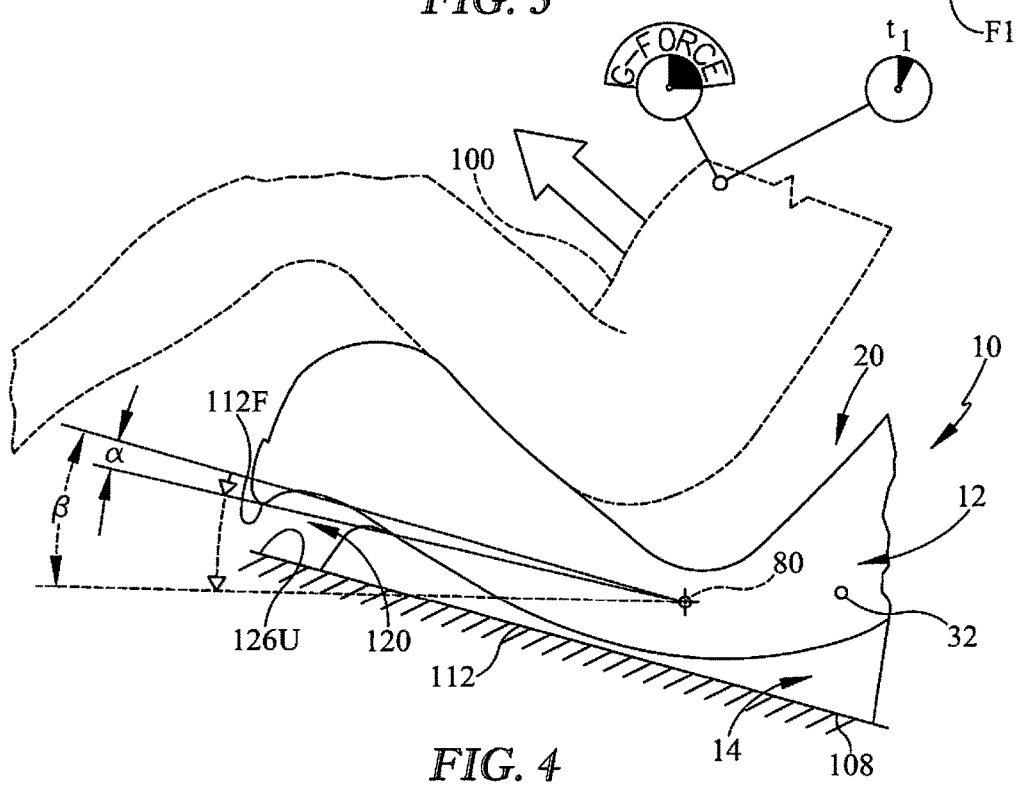
Figure 5:
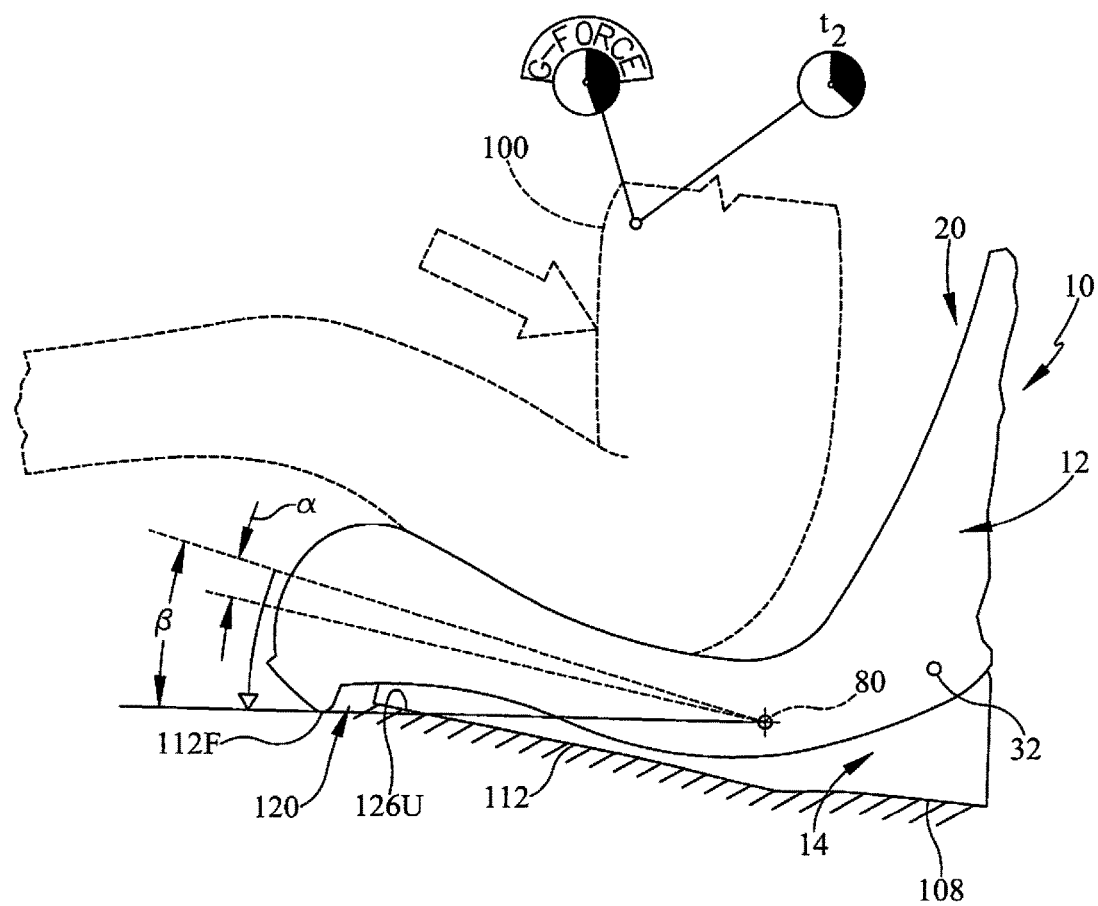
Figure 6:
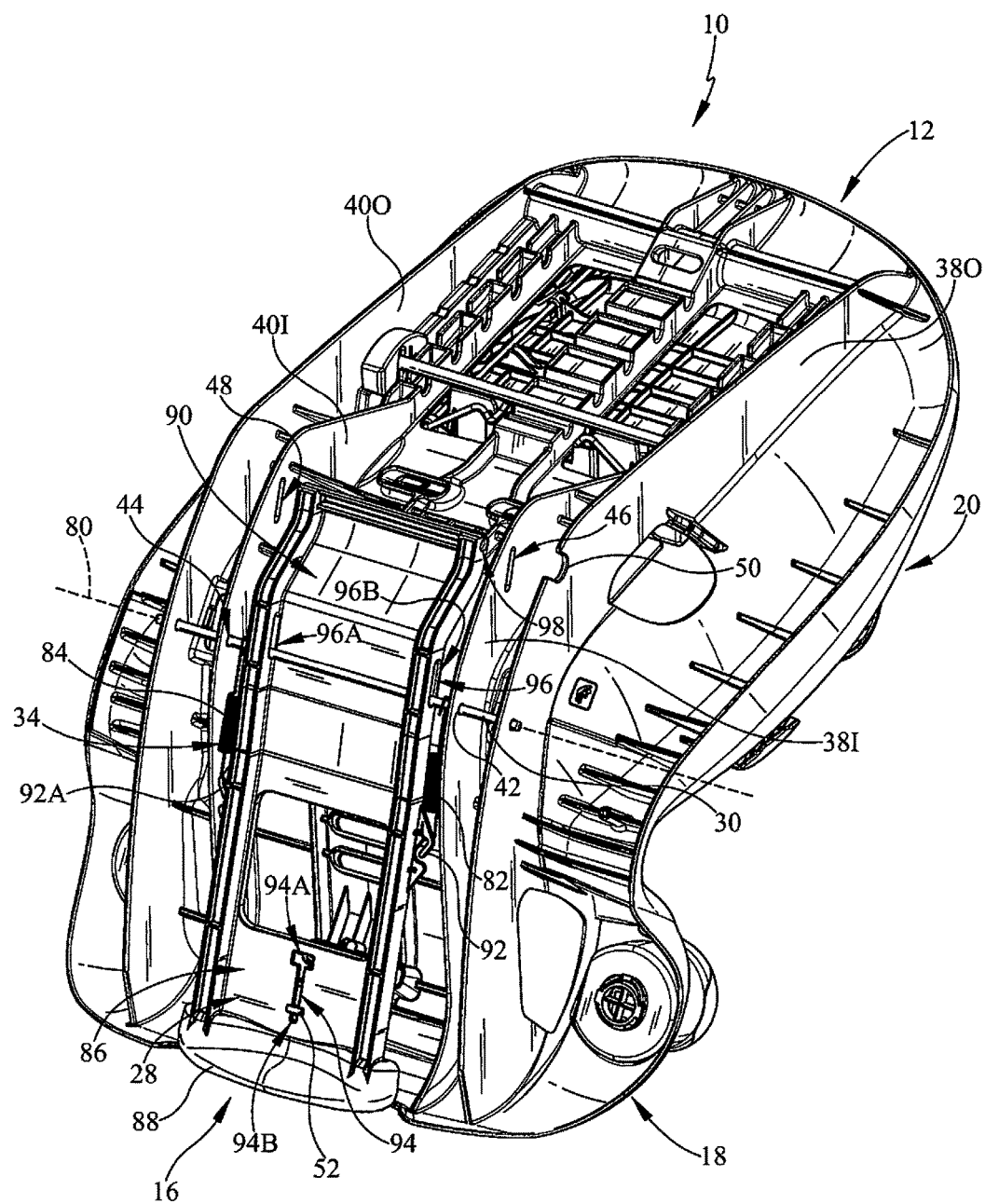
Figure 7:
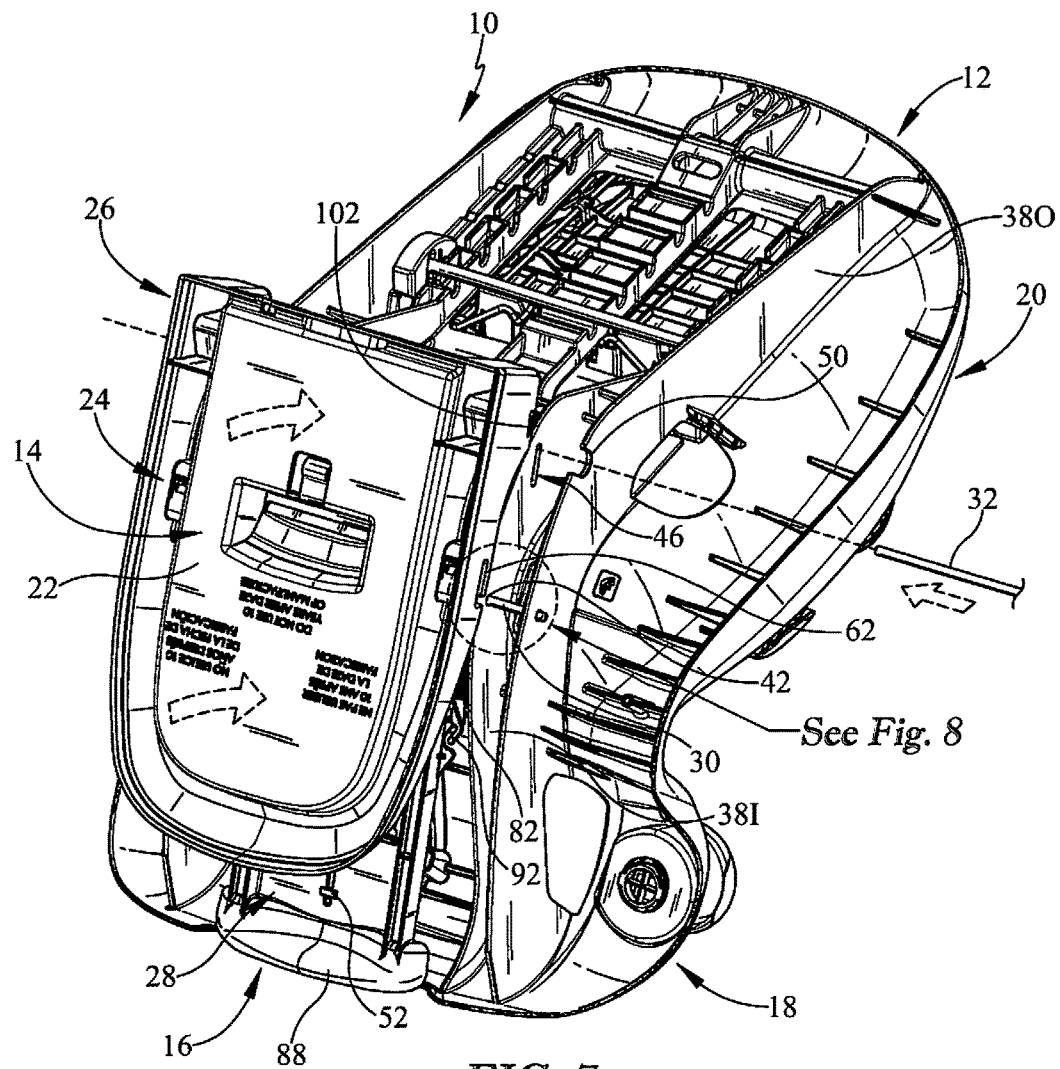
Figure 8:
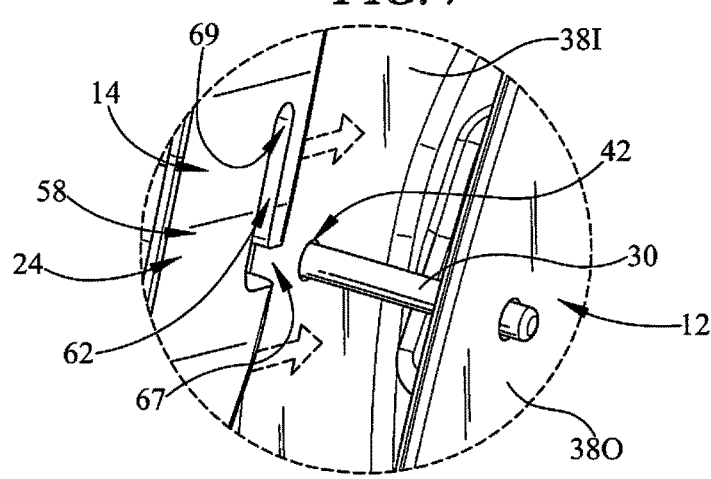
Figure 9:
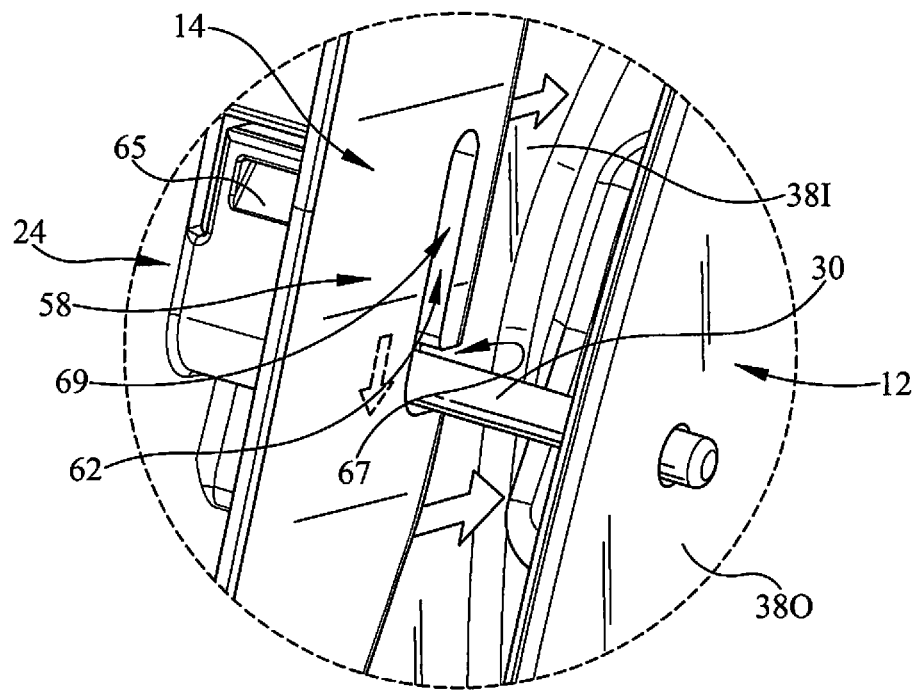
Figure 10:
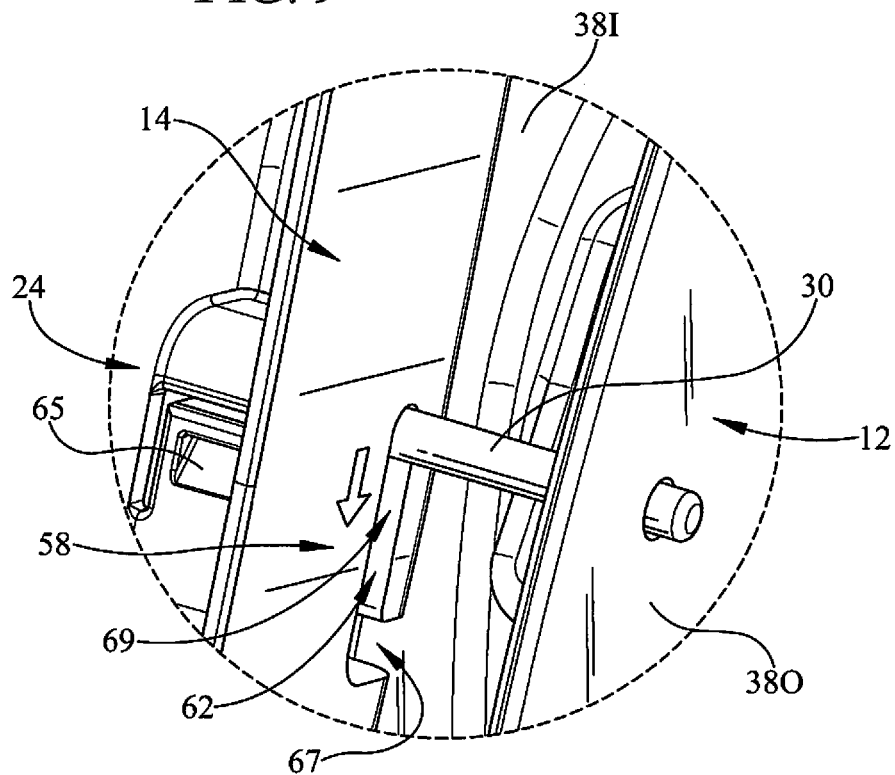
Figure 11:
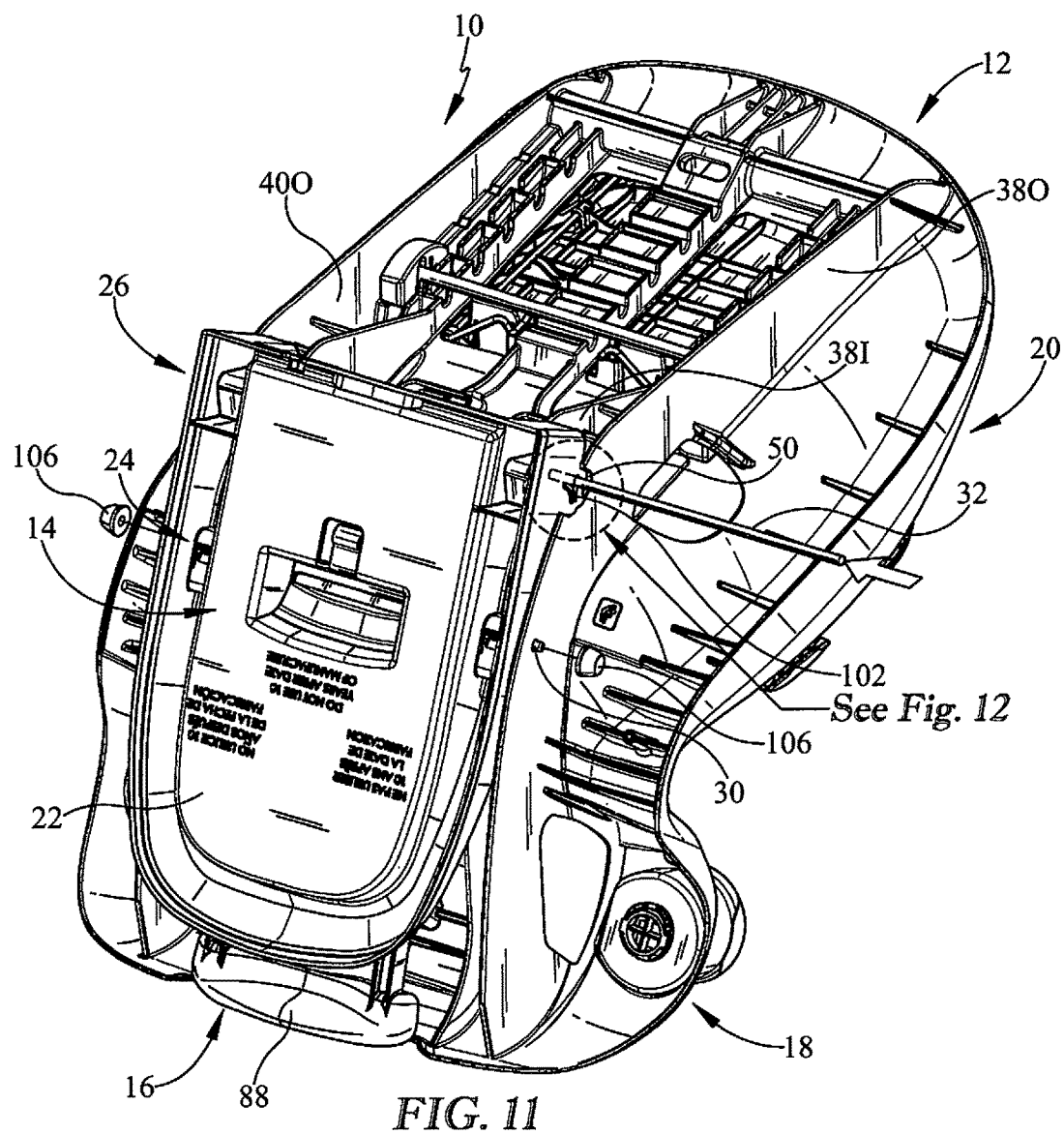
Figure 12:
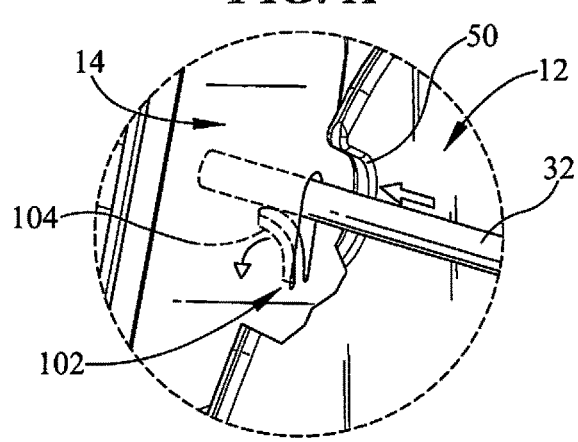

FIG. 3 is a diagrammatic view of a child restraint in accordance with the present disclosure showing that at time $t_0$ an initial external force is applied to the child restraint and g's experienced by a child in the child restraint are about 0 and suggesting that that the child moves forward relative to the child restraint to cause the child restraint to deform as suggested in FIGS. 4 and 5 so that g's measured on child's chest are minimized;

FIG. 4 is a view similar to FIG. 3 showing that at time $t_1$ after the external force has been applied to the child restraint, the child has moved forward relative to the seat back of the child restraint causing the child restraint to deform by a first amount as measured by angle α so that g's measured on child's chest are minimized;

FIG. 5 is a view similar to FIG. 4 showing that at a later time $t_2$ after the external force has been applied to the child restraint, the child has moved to a full-forward position relative to the seat back of the child restraint and begun to rebound toward the seat back causing the child restraint to continue deforming by a relatively greater second amount as measured by angle β so that g's measured on the child's chest are minimized during and after application of the external force to the child restraint;

FIGS. 6-12 are a series of views showing assembly of the child restraint;

FIG. 6 is a perspective view of an underside of the child restraint showing the seat lock coupled to the tiltable juvenile vehicle seat and suggesting that the pair of springs coupled to the pivot pin bias the seat-motion blocker of the seat lock toward a rear of the tiltable juvenile vehicle seat;

FIG. 7 is a view similar to FIG. 6 showing the seat support spaced apart from the tiltable juvenile vehicle seat and seat lock so that openings of L-shaped pivot pin slots are aligned with the pivot pin and that the lock pin is aligned with lock-pin receiving slots formed in the first and second ribs of the tiltable juvenile vehicle seat;

FIG. 8 is an enlarged view of FIG. 7 showing the seat support spaced apart from the tiltable juvenile vehicle seat and seat lock so that an opening of one of the L-shaped pivot pin slots is aligned with the pivot pin;

FIG. 9 is a view similar to FIG. 8 after the seat support has been moved toward the pivot pin to cause the pivot pin to be received in the L-shaped pivot pin slots and suggesting that the seat support is moved downwardly relative to the pivot pin to cause a blocking end of the L-shaped slots to engage the pivot pin;

FIG. 10 is a view similar to FIG. 9 after the seat support has been moved downwardly relative to the pivot pin so that the blocking ends of the L-shaped slots engage the pivot pin to cause the seat support to be pivotably coupled to the pivot pin and a pivot pin blocker included in the seat support blocks translation of the seat support relative to the pivot pin so that the pivot pin is blocked from exiting the L-shaped slot;

FIG. 11 is a perspective view of the child restraint of FIG. 6 after the seat support has been coupled to the pivot pin and showing the lock pin inserted through the lock-receiving slot formed in the first rib of the tiltable juvenile vehicle seat and suggesting that the lock pin is inserted through the lock-pin receiving slots formed in the tiltable juvenile vehicle seat, the lock-pin access formed in the seat support, and a lock-pin channel formed in the seat lock;

FIG. 12 is an enlarged view of FIG. 11 showing that the lock-pin access included in the seat support includes a deformable flange that extends into an opening formed in the seat support and further showing that the deformable flange pivots when the lock pin is inserted into the lock-pin access to allow the lock pin to pass through the lock-pin access.

Figure 17:
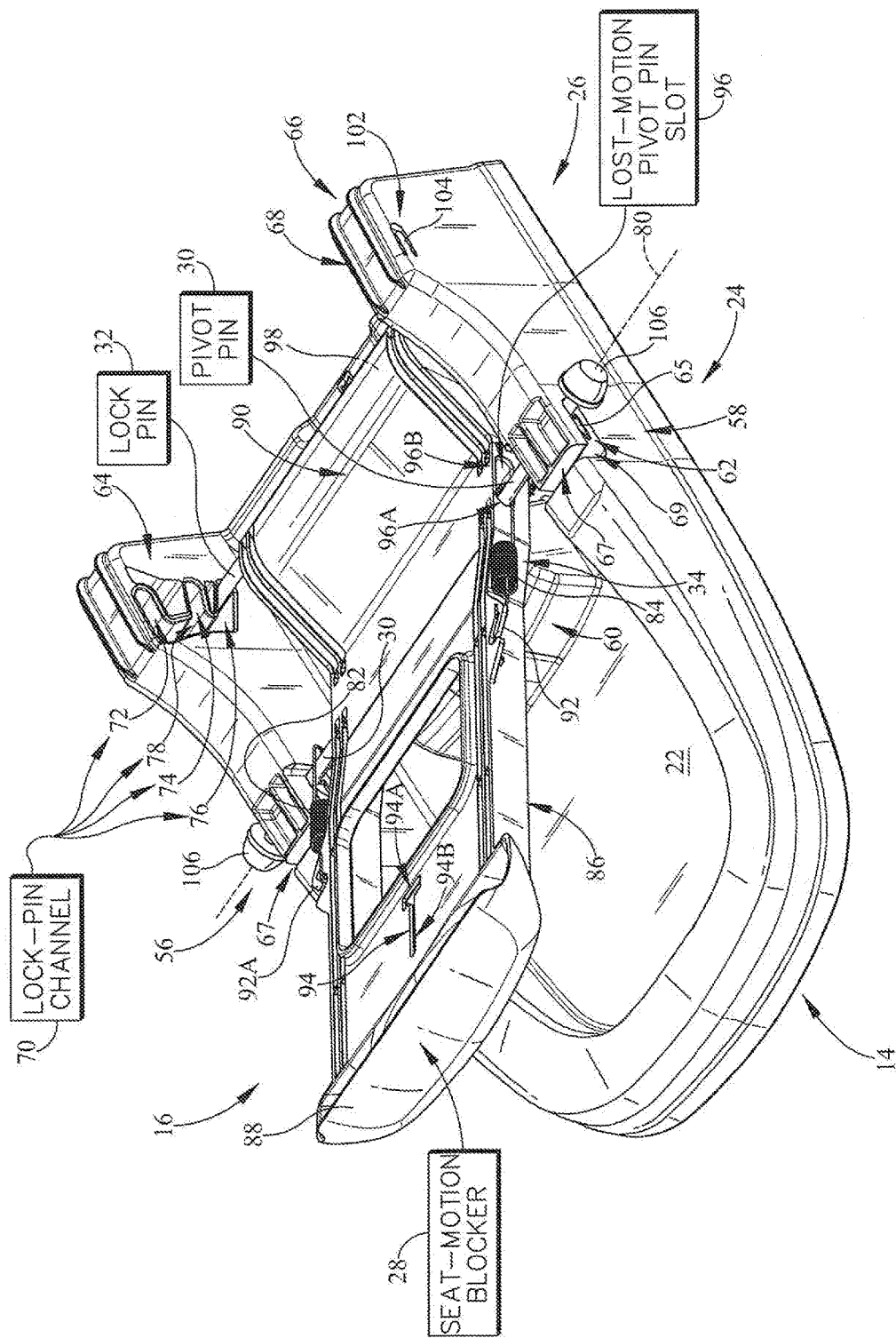
Figure 18:
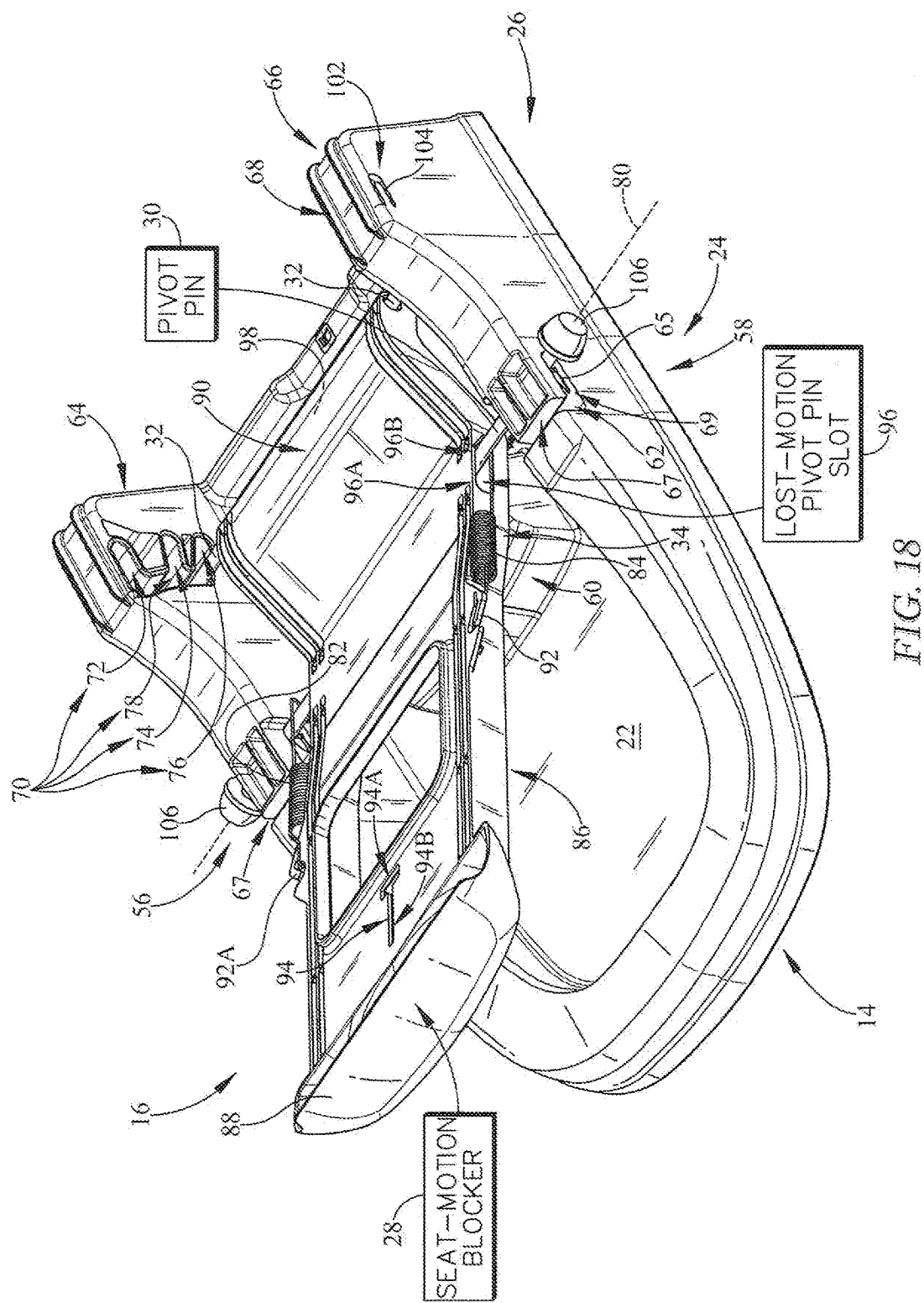
Figure 19:
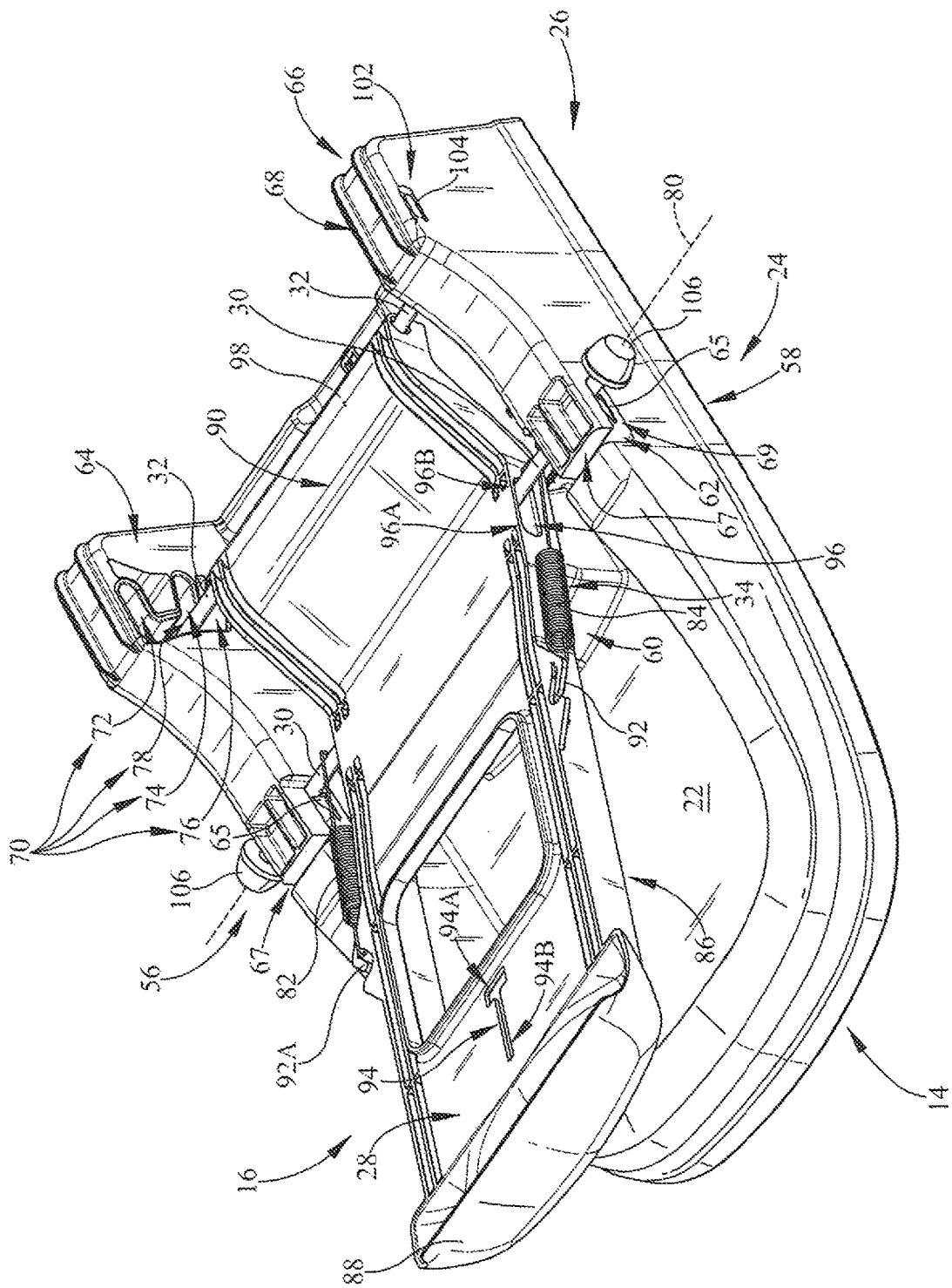
Figure 20:
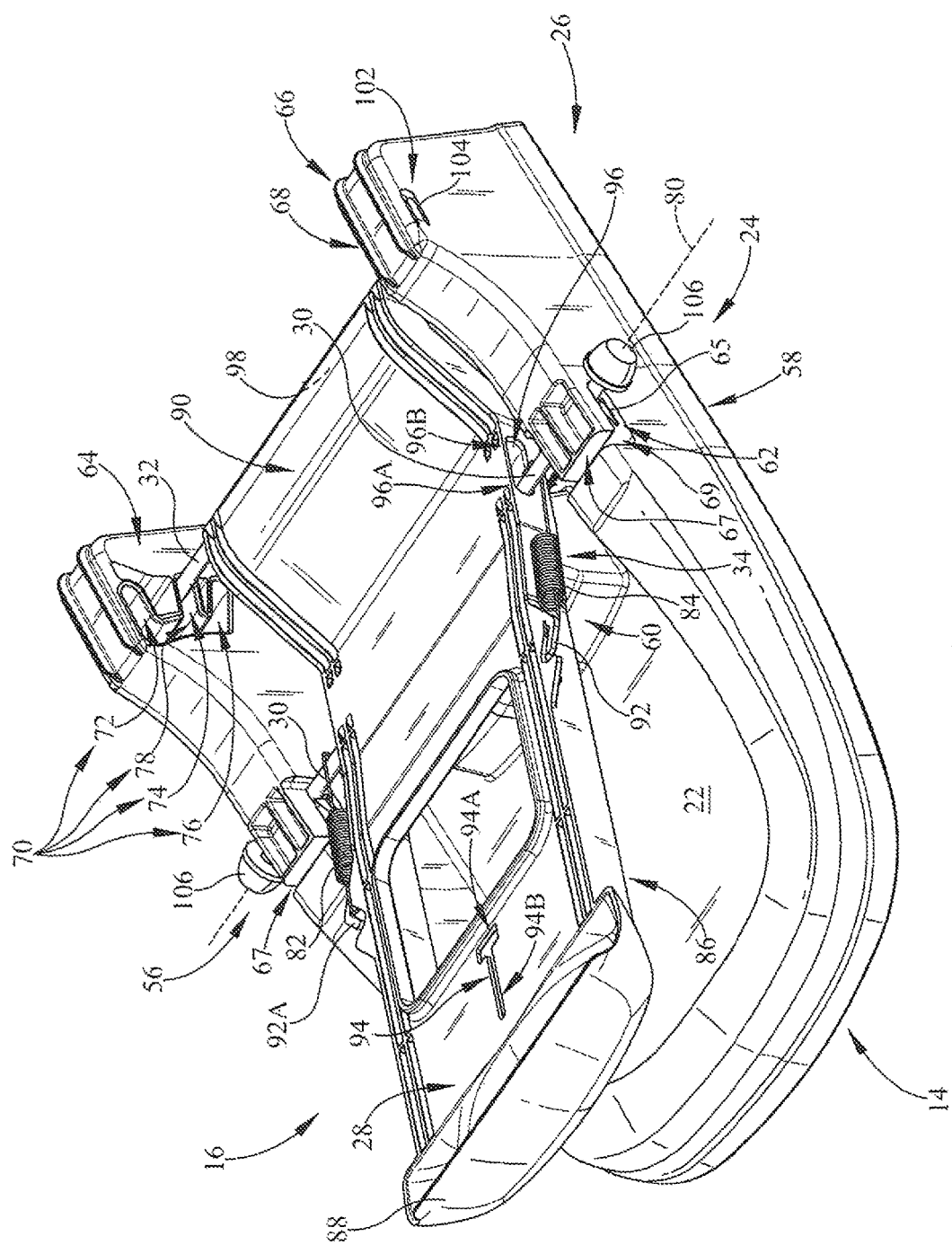
Figure 21:
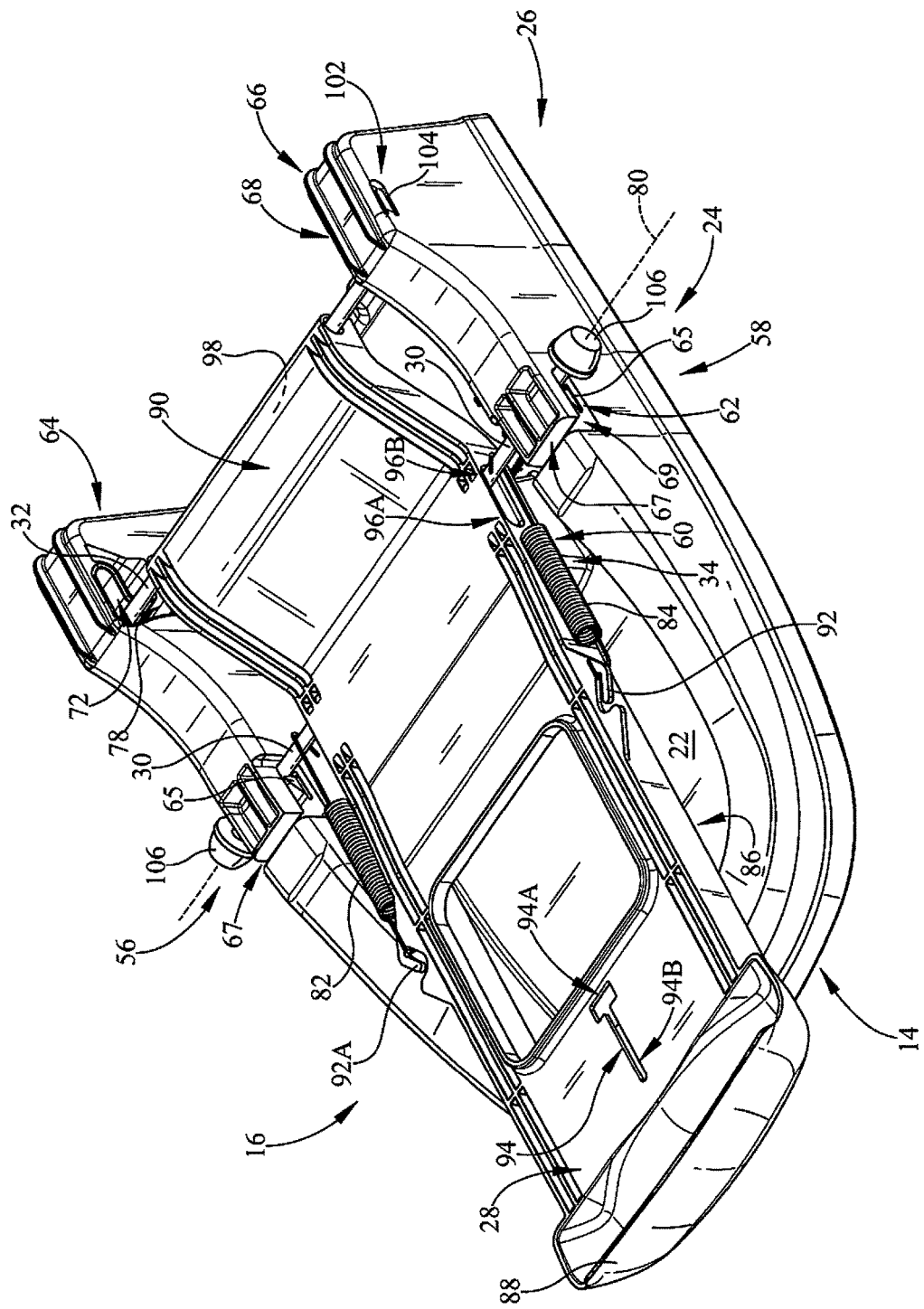
Figure 22:
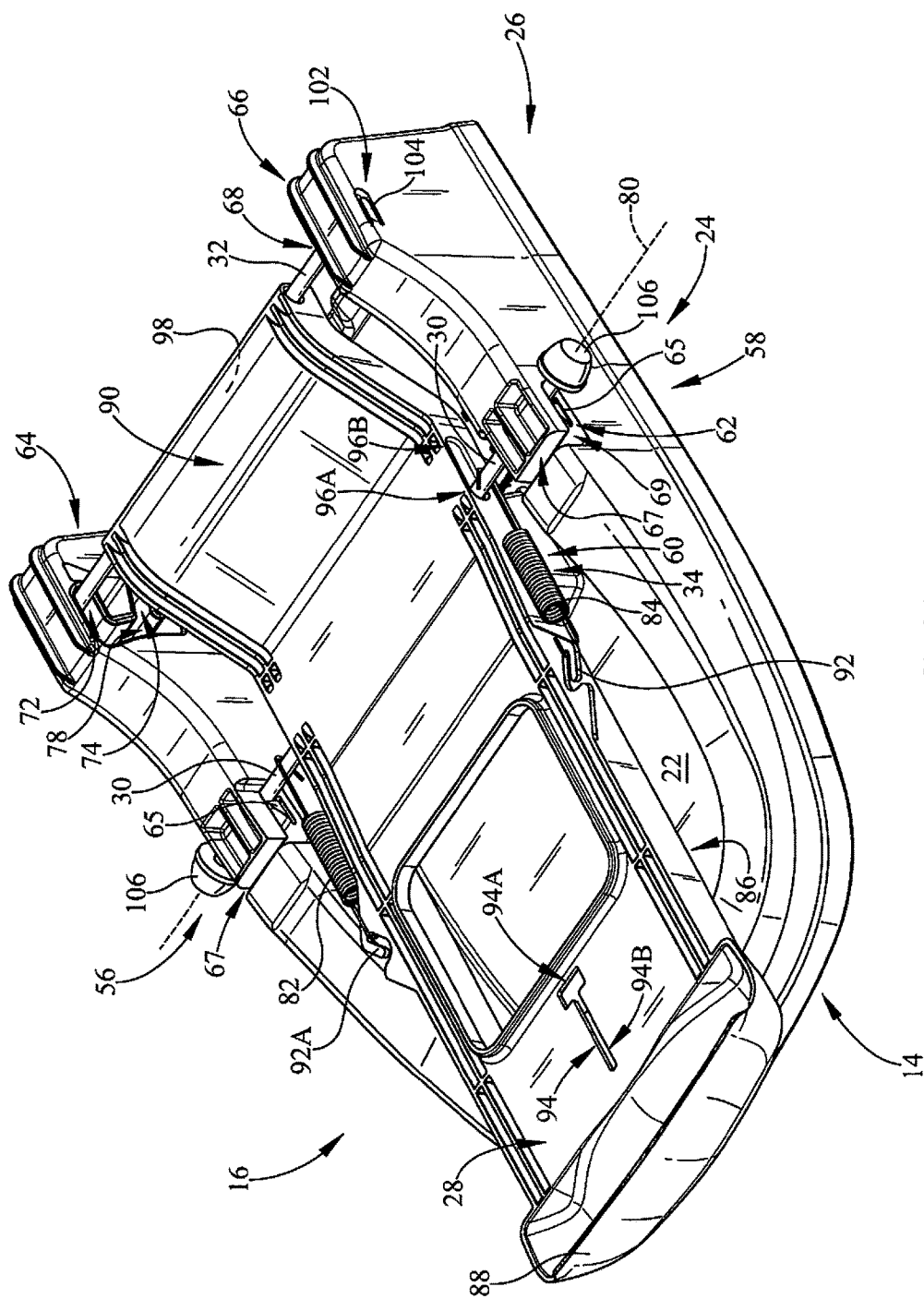

FIG. 13 is a perspective view of the child restraint in an upright arrangement and suggesting that the seat lock moves between a retracted position and an extended position relative to the seat support to free the tiltable juvenile vehicle seat for pivotable movement about a pivot axis relative to the seat support between the upright arrangement and one of two tilt arrangements and further showing a portion of the tiltable juvenile vehicle seat broken away to reveal a lock mount included in the seat support and the lock pin (see FIG. 1A) included in the seat lock and configured to be received in the lock mount to retain the tiltable juvenile vehicle seat in place relative to the seat support and suggesting that the seat lock may be pulled outwardly away from the seat support to move the lock pin and free the child restraint for pivotable movement relative to the seat support;

FIG. 13A is an enlarged view of FIG. 13 showing the lock pin included in the seat lock received in a first channel section formed in the seat support to retain the tiltable juvenile vehicle seat in the upright arrangement relative to the seat support;

FIG. 14 is a view similar to FIG. 13 showing after the seat lock has been pulled outwardly relative to the seat support to cause the seat lock to be in the extended position and further showing portions of the child restraint broken away to reveal that the lock pin is moved out of the first channel section and into a transfer channel section to free the tiltable juvenile vehicle seat for pivotable movement relative to the seat support when the seat lock is in the extended position and suggesting that the tiltable juvenile vehicle seat may be pivoted clockwise about the pivot axis relative to the seat support to assume one of two tilt arrangements when the seat lock is in the extended position;

FIG. 14A is an enlarged view of FIG. 14 showing the lock pin included in the seat lock received in an upper end of the transfer channel section formed in the seat support to free the tiltable juvenile vehicle seat for pivotable movement about the pivot axis relative to the seat support;

FIG. 15 is a view similar to FIG. 14 showing the seat lock in the extended position in which the lock pin included in the seat lock is received in the transfer channel section and the tiltable juvenile vehicle seat has been pivoted clockwise about the pivot axis relative to the seat support to assume a second tilt arrangement;

FIG. 15A is an enlarged view of FIG. 15 showing the lock pin included in the seat lock received in a lower end of the transfer channel section formed in the seat support as a result of the tiltable juvenile vehicle seat being pivoted about the pivot axis relative to the seat support to assume the second tilt arrangement;

FIG. 16 is a view similar to FIG. 15 showing the seat lock in a retracted position in which the lock pin included in the seat lock is received in the third channel section formed in the seat support as a result of a user releasing the seat lock and bias members included in the seat lock biasing the seat lock inwardly relative to the seat support and suggesting that the lock pin is received in the third channel section to block relative movement between the tiltable juvenile vehicle seat and the seat retainer to retain the child restraint in the second tilt arrangement;

FIG. 16A is an enlarged view of FIG. 16 showing the lock pin included in the seat lock received in the third channel section formed in the seat support as a result of the seat lock being released by a user to block relative movement between the tiltable juvenile vehicle seat and the seat retainer to retain the child restraint in the second tilt arrangement;

FIG. 17 is a perspective view of the seat lock and seat support included in the child restraint of FIG. 16 when the child restraint is in the second tilt arrangement showing that the seat-motion blocker is in the retracted position in which the pivot pin is located toward a retracted end of the lost-motion pivot pin slot and the lock pin is in the third channel section formed in lock mount included in the seat support to block the seat lock and the tiltable juvenile vehicle seat from pivoting about the pivot axis relative to the seat support to cause the child restraint to assume the second tilt arrangement and suggesting that bias members are coupled to the seat-motion blocker and to the pivot pin to bias the seat-lock toward the retracted position;

FIG. 18 is a view similar to FIG. 17 showing that the a user has overcome the bias force to move the seat-motion blocker to the extended position in which the pivot pin is located toward an extended end of the lost-motion pivot pin slot and the lock pin is in a lower end of the transfer channel section formed in lock mount included in the seat support to free the seat lock and the tiltable juvenile vehicle seat to pivot about the pivot axis relative to the seat support and allow the child restraint to assume one of the upright arrangement and first tilt arrangement;

FIG. 19 is a view similar to FIG. 18 showing that the tiltable juvenile vehicle seat has been pivoted counterclockwise about the pivot axis by a user relative to the seat support so that the child restraint assumes the first tilt position while the seat-motion blocker is in the extended position so that the pivot pin is located toward the extended end of the lost-motion pivot pin slot and the lock pin is in the transfer channel section formed in lock mount included in the seat support and aligned with the second channel section;

FIG. 20 is a view similar to FIG. 19 after the user has released the seat-motion blocker so that the bias members bias the seat lock to the retracted position in which the pivot pin is located toward the retracted end of the lost-motion pivot pin slot and the lock pin is in the second channel section formed in lock mount included in the seat support to block the seat lock and the tiltable juvenile vehicle seat from pivoting about the pivot axis relative to the seat support to cause the child restraint to be retained in the first tilt arrangement;

FIG. 21 is a view similar to FIG. 20 showing that the a user has overcome the bias force to move the seat-motion blocker to the extended position in which the pivot pin is located toward an extended end of the lost-motion pivot pin slot and the user has pivoted the tiltable juvenile vehicle seat counter-clockwise relative to the seat support so that the lock pin is in an upper end of the transfer channel section and aligned with the first channel section to cause the child restraint to assume the upright arrangement; and FIG. 22 is a view similar to FIG. 21 after the user has released the seat-motion blocker so that the bias members bias the seat lock to the retracted position in which the pivot pin is located toward the retracted end of the lost-motion pivot pin slot and the lock pin is in the first channel section formed in lock mount included in the seat support to block the seat lock and the tiltable juvenile vehicle seat from pivoting about the pivot axis relative to the seat support to cause the child restraint to be retained in the upright arrangement.

DETAILED DESCRIPTION

A child restraint 10 in accordance with the present disclosure is shown in FIGS. 1, 2, and 13-16. Child restraint 10 includes a tiltable juvenile vehicle seat 12, a seat support 14, and a seat lock 16 arranged to control relative movement between tiltable juvenile vehicle seat 12 and seat support 14. A lock pin 32 included in seat lock 16 extends through lock-pin receiving slots 46 formed in ribs 381, 380 to interconnect tiltable juvenile vehicle seat 12 to seat support 14 to cause seat support 14 to deform in response to application of an external force caused by an impact event being applied to the child restraint so that g's measured at a chest of a child are minimized during the impact event as suggested in FIGS. 3-5.

In the illustrative embodiment, tiltable juvenile vehicle seat 12 includes a seat bottom 18 and a seat back 20 extending upwardly away from seat bottom 18 as shown in FIG. 13. Seat support 14 is arranged to be set on a vehicle seat underlying seat support 14. Seat support 14 is coupled to tiltable juvenile vehicle seat 12 for pivotable movement relative to tiltable juvenile vehicle seat 12. Seat support 14 is arranged to retain child restraint 10 in one of an upright arrangement and at least one tilt arrangement as suggested in FIGS. 13-16 while permitting deformation of seat support 14 in response to impact event as suggested in FIGS. 3-5. Seat support 14 includes a support foundation 22, a pivot mount 24 coupled to support foundation 22 and defining a pivot axis 80, and a lock mount 26 coupled to support foundation 22 and spaced apart from pivot mount 24 toward seat back 20 of tiltable juvenile vehicle seat 12.

Figure 1:
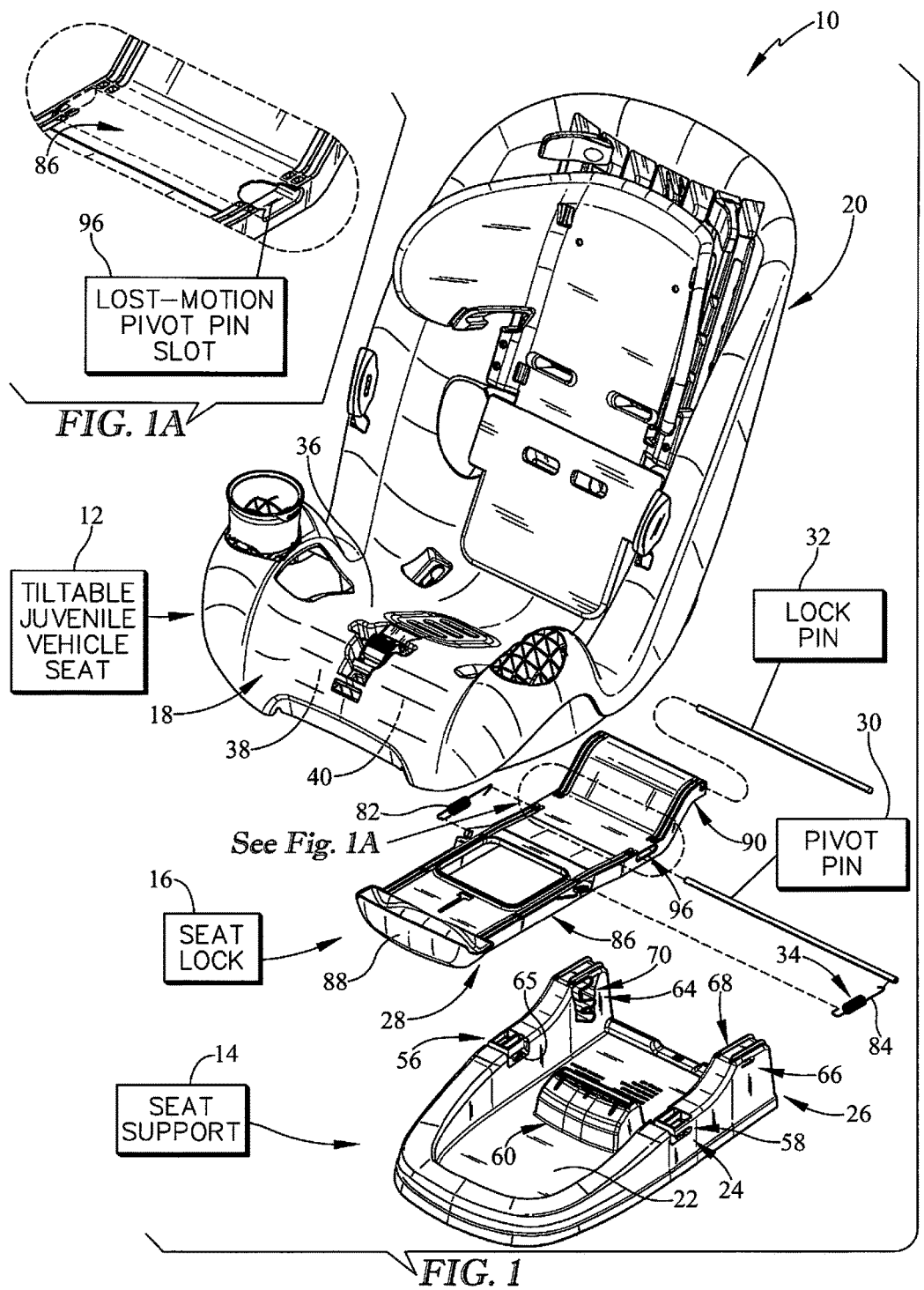
FIG. 1A is an enlarged perspective view of the seat lock of FIG. 1 with portions broken away to show that the seat-motion blocker is formed to define a lost-motion pivot pin slot arranged to receive the pivot pin therein to couple the seat lock and the seat support to the tiltable juvenile vehicle seat and that the lost-motion pivot pin slot extends through the seat-motion blocker.
Figure 2:
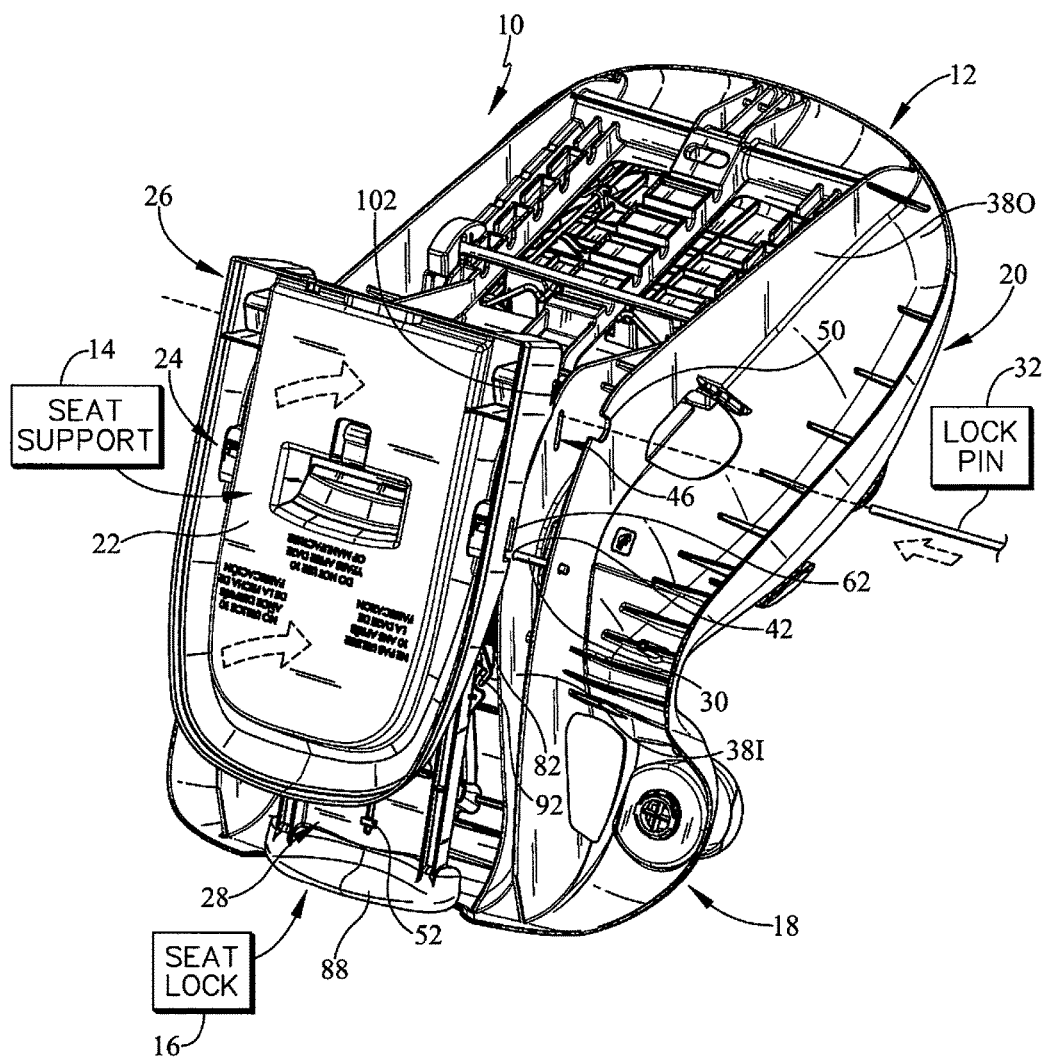
FIG. 2 is a bottom-rear perspective view of the child restraint of FIG. 1 showing that the seat support is coupled to the tiltable juvenile vehicle seat by the lock pin which extends through a lock-pin receiving slot formed in the tiltable juvenile vehicle seat and through the seat support.

Seat lock 16 is coupled to tiltable juvenile vehicle seat 12 and to seat support 14 as suggested in FIGS. 1 and 17. Seat lock 16 includes a seat-motion blocker 28, a pivot pin 30, a bias member 34, and a lock pin 32 as shown in FIG. 1.

In illustrative embodiments, seat-motion blocker 28 is arranged to move between a retracted position in which seat lock 16 blocks relative movement between tiltable juvenile vehicle seat 12 and seat support 14 and an extended position in which tiltable juvenile vehicle seat 12 is free to move relative to seat support 14 as suggested in FIGS. 13, 15, 17, and 18. Pivot pin 30 extends through tiltable juvenile vehicle seat 12, pivot mount 24, and seat-motion blocker 28 to pivotably couple tiltable juvenile vehicle seat 12 to seat support 14. Bias member 34 is coupled to pivot pin 30 and to seat-motion blocker 28 to bias seat-motion blocker 28 toward the retracted position. Lock pin 32 is coupled to seat-motion blocker 28 toward seat back 20 and is arranged to be received in lock-pin channels 70 formed in lock mount 26 included in seat support 14 to block tiltable juvenile vehicle seat 12 from pivoting about pivot axis 80 relative to seat support 14 to retain child restraint 10 in one of the upright arrangement and the at least one tilt arrangement.

Seat lock 16 is arranged to couple to tiltable juvenile vehicle seat 12 so that a gap 120 is formed between handle 88 and seat support 14 as suggested in FIGS. 3-5. Illustratively, child restraint 10 is configured to deform and reduce a size of gap 120 during impact events. Seat lock and seat support 14 are coupled to tiltable juvenile vehicle seat 12 by pivot pin 30 and lock pin 32. Pivot pin 30 is located toward the middle portion of seat support 14 and lock pin 32 is located toward the rear end of seat support 14 toward seat back 20. As a result, forces applied to a child supported in child restraint 10 are distributed to minimize forces in a chest of the child during impact events.

Child restraint 10 is configured to deform in a controlled manner in response to an external force F1 being applied to child restraint 10. In one example, external force F1 may be an impact force provided by an impact event such as a front-end collision to a vehicle carrying child restraint 10. Controlled deformation of child restraint 10 minimizes g's measured on a chest of a child 100 restrained by child restraint 10 during and after application of external force F1 as shown in FIGS. 3-5. A gap 120 is formed between a front bottom edge 112F and an upper surface 126U of a seat bench 112 included in a vehicle seat 108 underlying child restraint 10 as shown in FIG. 3.

An external force F1 is applied to child restraint 10 at a time $t_0$ as shown in FIG. 3. A child 100 restrained by child restraint 10 begins to move forward in response to external force F1 relative to child restraint 10. As a result, child 100 begins to apply a reaction load to child restraint 10 to cause child restraint 10 to deform in a controlled manner and begin to close gap 120 as suggested in FIG. 3 and shown in FIGS. 4 and 5. As child restraint 10 deforms in a controlled manner, energy is absorbed by child restraint 10 so that g's experienced by child 100 are minimized during and after application of external force F1.

At a time $t_1$ after application of external force F1, child 100 has moved in a forward direction away from seat back 20 of child restraint 10 as shown in FIG. 4. As child 100 moves forward relative to child restraint 10, the reaction load is applied to child restraint 10 causing child restraint 10 to deform a first amount as measured by an angle α to begin closing gap 120 as shown in FIG. 4. In one example, angle α is in a range of about 10 degrees to about 15 degrees. In another example, angle α is about 14 degrees. In another example, angle α is about 13.7 degrees.

At a time $t_2$ after time $t_1$, child 100 has moved to a full-forward position relative to child restraint 10 and begun to rebound back toward seat back 20 as shown in FIG. 5. As a result, the reaction load applied to child restraint 10 causes further controlled deformation as measured by angle β to further close gap 120. Further deformation of child restraint 10 minimizes g's measured on a chest of child 100 as shown in FIG. 5. In one example, angle β is in a range of about 15 degrees to 20 degrees. In another example, angle β is about 19 degrees. In another example, angle β is about 18.9 degrees. In one example, the reaction load applied to a seat pan 36 included in child restraint 10 is about 170 lbs. Had child restraint 10 not deformed in a controlled manner as suggested in FIGS. 3-5, the reaction load might have been about 215 lbs. In one example, an impact event may be modeled using a Federal Motor Vehicle Safety Standard sled pulse of 25 g's applied to child restraint 10. A child restraint in accordance with the present disclosure may reduce g's experienced in a chest of an occupant of the child restraint by about 20 percent. In one example, a six year old occupant of a child restraint in accordance with the present disclosure may experience about 45 g's during and after an impact event. Had the child restraint not deformed in a controlled manner, the six year old occupant might experience about 55 g's during and after the impact event.

Child restraint 10 includes tiltable juvenile vehicle seat 12, seat support 14, and seat lock 16 as shown in FIG. 1. Tiltable juvenile vehicle seat 12 includes seat bottom 18 and seat back 20 extending upwardly away from seat bottom 18. Seat support 14 includes a support foundation 22 arranged to set on a passenger seat of a vehicle, pivot mount 24 arranged to receive pivot pin 30, and lock mount 26 arranged to receive lock pin 32 as shown in FIG. 1. Seat lock 16 includes seat-motion blocker 28, pivot pin 30, lock pin 32, and at least one bias member 34.

Seat bottom 18 includes a seat pan 36, first and second ribs 381, 401, and anchor tab 52 as shown in FIG. 6. In the illustrative embodiment, seat bottom 18 further includes outer ribs 380, 400. First and second ribs 381, 401 extend away from seat pan 36. Each rib 381, 401 is formed to include a pivot-pin receiving aperture 42, 44 and a lock-pin receiving slot 46, 48. In the illustrative embodiment, outer rib 380 is formed to include a lock-pin cutout 50 arranged to allow lock pin 32 to pass through outer rib 380 when lock pin 32 is being installed. Anchor tab 52 extends away from seat pan 36. Anchor tab 52 is received in a T-shaped guide slot 94 formed in seat-motion blocker 28 to guide seat-motion blocker 28 when seat-motion blocker 28 moves between the retracted and extended positions.

Anchor tab 52 is formed to include a wide upper portion and a narrow lower portion that is narrower than the wide upper portion. The wide upper portion is received in an upper portion 94A of T-shaped guide slot 94. The narrow lower portion allows seat-motion blocker 28 to slide relative to tiltable juvenile vehicle seat 12 while anchor tab 52 restricts relative movement between seat-motion blocker 28 and the tiltable juvenile vehicle seat 12 as suggested in FIG. 6. The upper wide portion of anchor tab 52 is blocked by a narrow lower portion 94B of T-shaped guide slot 94 so that seat-motion blocker 28 is slidably coupled to anchor tab 52.

Seat support 14 includes support foundation 22, pivot mount 24, and lock mount 26 as shown in FIG. 1. Support foundation 22 is arranged to set on a passenger seat of a vehicle. Pivot mount 24 includes first pivot-pin retainer 56, a second pivot-pin retainer 58 spaced apart from the first pivot-pin retainer 56, and a pivot-pin snap support 60 positioned between the first and second pivot-pin retainers 56, 58. Pivot mount 24 is located toward a middle portion of seat support 14. Lock mount 26 is spaced apart from pivot mount 24 and located toward a back end of seat support 14 and toward seat back 20. As a result, pivot pin 30 and pivot axis 80 are located toward the middle portion of seat support 14 and lock pin 32 is located toward the rear of seat support 14.

First and second pivot-pin retainers 56, 58 are each formed to include an L-shaped pivot pin slot 62 and include a pivot-pin blocker 65 as shown in FIG. 9. L-shaped pivot pin slots 62 receive pivot pin 30. L-shaped pivot pin slots 62 include an inlet channel 67 and a retention channel 69 as shown in FIGS. 7-10. Pivot-pin blockers 65 block pivot pin 30 from exiting L-shaped pivot pin slots 62. Pivot-pin snap support 60 is formed to include a C-shaped channel that supports pivot pin 30. Pivot pin 30 is arranged to snap into C-shape channel so that pivot pin 30 is pivotably coupled to pivot-pin snap support 60.

Lock mount 26 includes first lock-pin post 64 and second lock-pin post 66 as shown in FIG. 1. First and second lock-pin posts 64, 66 are formed to include lock-pin channels 68, 70. Each lock-pin channel includes a first channel section 72, a second channel section 74, a third channel section 76, and a transfer channel section 78 interconnecting channel section 72, 74, 76 as shown in FIGS. 13A-16A.

In the illustrative embodiment, second lock-pin post 66 includes a lock-pin access 102 as shown in FIGS. 11 and 12. Lock-pin access 102 includes deformable flange 104 that extends into an opening formed in lock-pin post 66. Deformable flange 104 pivots when lock pin 32 is inserted into lock-pin access 102 to allow lock pin 32 to pass through lock-pin access 102 as shown in FIG. 12. Deformable flange 104 included in lock-pin access 102 pivots and returns to its initial state after lock pin 32 is inserted fully into lock-pin access 102 to block lock pin 32 from exiting lock-pin access 102.

Seat lock 16 includes seat-motion blocker 28, pivot pin 30, lock pin 32, and at least one bias member 34 as shown in FIG. 1. Seat-motion blocker 28 is arranged to be moved between a retracted position and an extended position relative to seat support 14 to free tiltable juvenile vehicle seat 12 for pivotable movement about pivot axis 80 extending through pivot-pin receiving apertures 42, 44 as shown in FIGS. 17-22. Pivot pin 30 is configured to pivotably couple tiltable juvenile vehicle seat 12 to seat lock 16 and seat support 14 as suggested in FIG. 6. Lock pin 32 is configured to be received in one of first, second, and third channel sections 72, 74, 76 to block relative movement between tiltable juvenile vehicle seat 12 and seat support 14. Lock pin 32 is configured to be received in transfer channel section 78 when seat-motion blocker 28 is in the extended position to free tiltable juvenile vehicle seat 12 to pivot about pivot axis 80 relative to seat support 14 between an upright arrangement and one of two tilt positions. Bias member 34 illustratively includes two springs 82, 84 configured to bias seat-motion blocker 28 in the retracted position as suggested in FIG. 6.

Seat-motion blocker 28 includes a blocker body 86, a handle 88 coupled to the blocker body 86, and a lock body 90 as shown in FIGS. 1 and 17. Blocker body 86 includes retainer fingers 92, 92A arranged to receive bias member 34, T-shaped guide slot 94, and lost-motion pivot pin slot 96. Lock body 90 is formed to include a pin channel 98 arranged to receive lock pin 32.

Seat-motion blocker 28 is formed to define lost-motion pivot pin slot 96 that extends through seat-motion blocker 28 as shown in FIG. 1A. Lost-motion pivot pin slot 96 receives pivot pin 30 to couple seat lock 16 and seat support 14 to tiltable juvenile vehicle seat 12 as shown in FIG. 1A.

In the illustrative embodiment, lock pin 32 is inserted through lock-pin cutout 50 formed in outer rib 380 as lock pin 32 is inserted through lock-pin access 102. Lock-pin cutout 50 aligns with lock-pin access 102 during assembly of child restraint 10. Lock-pin cutout 50 moves out of alignment with lock-pin access 102 after assembly, so that outer rib 380 blocks access to lock-pin access 102. In the illustrative embodiment, end caps 106 are coupled to each end of pivot pin 30.

Child restraint 10 is configured to move between an upright arrangement and two tilt arrangements as suggested in FIGS. 17-22. FIGS. 17-22 show seat support 14 and seat lock 16 uncoupled from tiltable juvenile vehicle seat 12 to illustrate positions of components included in child restraint 10 when child restraint 10 is in the upright arrangement, the first tilt arrangement, and the second tilt arrangement and while child restraint 10 is transitioning between the arrangements.

As shown in FIG. 17, child restraint 10 is arranged to assume the second tilt arrangement. When child restraint 10 is in the second tilt arrangement, seat-motion blocker 28 is in the retracted position in which pivot pin 30 is located toward retracted end 96A of lost-motion pivot pin slot 96. Lock pin 32 is received in third channel section 76 formed in lock mount 26 to block seat lock 16 and tiltable juvenile vehicle seat 12 from pivoting about pivot axis 80 relative to seat support 14.

A user may overcome the bias force applied to seat-motion blocker 28 to move seat-motion blocker 28 to the extended position as shown in FIG. 18. In the extended position, pivot pin 30 is located toward an extended end 96B of lost-motion pivot pin slot 96. As seat-motion blocker 28 moves to the extended position, lock pin 32 moves to a lower end of transfer channel section 78 formed in lock mount 26 to free seat lock 16 and tiltable juvenile vehicle seat 12 to pivot about pivot axis 80 relative to seat support 14 and allow child restraint 10 to assume one of the upright arrangement and the first tilt arrangement.

Tiltable juvenile vehicle seat 12 may be pivoted counter-clockwise about pivot axis 80 by a user relative to seat support 14 while seat-motion blocker 28 is in the extended position as suggested in FIG. 19. As such, child restraint 10 may be pivoted to assume the first tilt position. As shown in FIG. 19, seat-motion blocker 28 is in the extended position so that pivot pin 30 is located toward extended end 96B of lost-motion pivot pin slot 96. As a result, lock pin 32 is in transfer channel section 78 formed in lock mount 26 and aligned with second channel section 74.

Child restraint 10 is arranged to assume the first tilt arrangement as shown in FIG. 20. When the user releases handle 88 of seat lock 16, child restraint 10 is retained in the first tilt position by lock pin 32 and seat support 14 as shown in FIG. 20. When handle 88 of seat lock 16 is released, bias members 34 bias seat lock 16 to the retracted position as shown in FIG. 20. In the retracted position, pivot pin 30 is located toward retracted end 96A of lost-motion pivot pin slot 96. Lock pin 32 is located in second channel section 74 formed in lock mount 26 to block seat lock 16 and tiltable juvenile vehicle seat 12 from pivoting about pivot axis 80 relative to seat support 14 to cause child restraint 10 to be retained in the first tilt arrangement.

A user may overcome the bias force applied to seat-motion blocker 28 by bias members 34 to move seat-motion blocker 28 to the extended position to free tiltable juvenile vehicle seat 12 for pivotable movement about pivot axis 80 relative to seat support 14 as suggested in FIG. 21. In the extended position, pivot pin 30 is located toward an extended end 96B of lost-motion pivot pin slot 96. The user may pivot tiltable juvenile vehicle seat 12 counter-clockwise relative to seat support 14 so that lock pin 32 is located in an upper end of transfer channel section 78 and aligned with first channel section 72 as shown in FIG. 21. As a result, child restraint 10 is oriented in the upright arrangement.

Child restraint 10 is arranged to be retained in the upright arrangement as shown in FIG. 22. When the user releases handle 88 of seat lock 16, child restraint 10 is retained in the upright arrangement by lock pin 32 and seat support 14 as shown in FIG. 22. When handle 88 of seat lock 16 is released, bias members 34 bias seat lock 16 to the retracted position as shown in FIG. 22. In the retracted position, pivot pin 30 is located toward retracted end 96A of lost-motion pivot pin slot 96. Lock pin 32 is located in first channel section 72 formed in lock mount 26 to block seat lock 16 and tiltable juvenile vehicle seat 12 from pivoting about pivot axis 80 relative to seat support 14 to cause child restraint 10 to be retained in the upright arrangement.

In one example, the seat support is arranged to be set on a vehicle passenger seat underlying the seat support. The seat support is pivotably coupled to the tiltable juvenile vehicle seat and arranged to retain the child restraint in one of an upright arrangement and at least one tilt arrangement. The seat support includes a support foundation, a pivot mount coupled to the support foundation and defining a pivot axis, and a lock mount coupled to the support foundation and spaced apart from the pivot mount toward the seat back of the tiltable juvenile vehicle seat.

In another example, the child restraint further includes a seat lock. The seat lock is coupled to the tiltable juvenile vehicle seat and to the seat support. The seat lock includes a seat-motion blocker, a pivot pin, a bias member, and a lock pin.

In another example, the seat-motion blocker is arranged to move between a retracted position in which the seat lock blocks relative movement between the tiltable juvenile vehicle seat and the seat support and an extended position in which the tiltable juvenile vehicle seat is free to move relative to the seat support. The pivot pin extends through the tiltable juvenile vehicle seat, the pivot mount included in the seat support, and the seat-motion blocker to couple the tiltable juvenile vehicle seat to the seat support for pivotable movement relative to the seat support. The bias member is coupled to the pivot pin and to the seat-motion blocker to bias the seat-motion blocker toward the retracted position. The lock pin is coupled to the seat-motion blocker toward the seat back and is arranged to be received in lock-pin channels formed in the lock mount included in the seat support to block the tiltable juvenile vehicle seat from pivoting about the pivot axis relative to the seat support to retain the child restraint in one of the upright arrangement and the at least one tilt arrangement.

The invention claimed is:

1. A child restraint comprising:
   a tiltable juvenile vehicle seat including a lock-pin receiving slot therein,
   a seat support adapted to be supported by a vehicle seat underlying the seat support and coupled to the tiltable juvenile vehicle seat for pivotable movement relative to the juvenile vehicle seat about a pivot axis between one of an upright arrangement and at least one tilt arrangement, and
   a seat lock coupled to the tiltable juvenile vehicle seat and to the seat support to selectively block movement of the tiltable juvenile vehicle seat between the upright arrangement and the tilt arrangement,
   wherein the seat lock includes a seat-motion blocker arranged to move between a retracted position in which the seat lock blocks relative movement between the tiltable juvenile vehicle seat and the seat support and an extended position in which the tiltable juvenile vehicle seat is free to move relative to the seat support, a pivot pin defining the pivot axis, arranged to extend through the seat support, the seat-motion blocker, and the tiltable vehicle seat, and a lock pin arranged to extend through the lock-pin receiving slot of the tiltable juvenile vehicle seat to interconnect the tiltable juvenile vehicle seat and the seat support to cause the seat support to deform in response to application of an external force to the juvenile restraint to cause the tiltable juvenile vehicle seat to rotate about the pivot axis toward the seat support through an angle β to minimize a gap formed between an upper surface of a seat bottom of a passenger vehicle seat and a front bottom edge of the seat lock so that g-forces exerted on a chest of a child restrained by the juvenile restraint are minimized.

2. The child restraint of claim 1, wherein the pivot pin is arranged to extend through a pivot-pin receiving aperture formed in the tiltable juvenile vehicle seat to interconnect the tiltable juvenile vehicle seat and the seat support.

3. The child restraint of claim 2, wherein the pivot pin is located between the front bottom edge of the seat lock and the lock pin.

4. The child restraint of claim 3, wherein the angle β is in a range of about 15 degrees to 20 degrees.

5. The child restraint of claim 4, wherein the angle β about 19 degrees.

6. The child restraint of claim 1, wherein the angle β about 19 degrees.

7. The child restraint of claim 1, wherein the g-forces exerted on the chest of the child are less than about 55 g's when a Federal Motor Vehicle Safety Standard sled pulse of 25 g's is applied to the child restraint.

8. The child restraint of claim 7, wherein the g-forces exerted on the chest of the child are less than about 45 g's when a Federal Motor Vehicle Safety Standard sled pulse of 25 g's is applied to the child restraint.

9. The child restraint of claim 8, wherein the g-forces exerted on the chest of the child are about 45 g's when a Federal Motor Vehicle Safety Standard sled pulse of 25 g's is applied to the child restraint.

10. The child restraint of claim 1, wherein the seat support includes a support foundation, a pivot mount coupled to the support foundation, and a lock mount coupled to the support foundation and spaced apart from the pivot mount toward a seat back of the tiltable juvenile vehicle seat.

11. The child restraint of claim 10, wherein the pivot pin extends through, the pivot mount included in the seat support, and the seat-motion blocker to couple the tiltable juvenile vehicle seat for pivotable movement relative to the seat support.

12. The child restraint of claim 11, wherein the lock pin is coupled to the seat-motion blocker toward the seat back and arranged to be received in the lock mount included in the seat support to block the tiltable juvenile vehicle seat from pivoting about the pivot axis relative to the seat support when the seat-motion blocker is in the retracted position to retain the child restraint in one of the upright arrangement and the at least one tilt arrangement.

13. A child restraint comprising:

a tiltable juvenile vehicle seat including a lock-pin receiving slot therein, a seat support adapted to be supported by a vehicle seat underlying the seat support and coupled to the tiltable juvenile vehicle seat for pivotable movement relative to the juvenile vehicle seat about a pivot axis between one of an upright arrangement and at least one tilt arrangement, and a seat lock coupled to the tiltable juvenile vehicle seat and to the seat support to selectively block movement of the tiltable juvenile vehicle seat between the upright arrangement and the tilt arrangement, wherein the seat lock includes a seat-motion blocker arranged to move between a retracted position in which the seat lock blocks relative movement between the tiltable juvenile vehicle seat and the seat support and an extended position in which the tiltable juvenile vehicle seat is free to move relative to the seat support, a pivot pin defining the pivot axis, and a lock pin arranged to extend through the lock-pin receiving slot of the tiltable juvenile vehicle seat to interconnect the tiltable juvenile vehicle seat and the seat support to cause the seat support to deform in response to application of an external force to the juvenile restraint to cause the tiltable juvenile vehicle seat to rotate about the pivot axis toward the seat support through an angle β to minimize a gap formed between an upper surface of a seat bottom of a passenger vehicle seat and a front bottom edge of the seat lock so that g-forces exerted on a chest of a child restrained by the juvenile restraint are minimized, wherein the seat support includes a support foundation, a pivot mount coupled to the support foundation, and a lock mount coupled to the support foundation and spaced apart from the pivot mount toward a seat back of the tiltable juvenile vehicle seat, wherein the pivot pin extends through the tiltable juvenile vehicle seat, the pivot mount included in the seat support, and the seat-motion blocker to couple the tiltable juvenile vehicle seat for pivotable movement relative to the seat support, wherein the lock pin is coupled to the seat-motion blocker toward the seat back and arranged to be received in the lock mount included in the seat support to block the tiltable juvenile vehicle seat from pivoting about the pivot axis relative to the seat support when the seat-motion blocker is in the retracted position to retain the child restraint in one of the upright arrangement and the at least one tilt arrangement, wherein the lock mount of the seat support includes a lock-pin post formed to include a lock-pin channel having a first channel section, a second channel section, and a transfer channel section interconnecting the first and second channel sections, the lock pin is received in one of the first and second channel sections to block relative movement between the tiltable juvenile vehicle seat and the seat support when the seat-motion blocker is in the retracted position, and the lock pin is received in the transfer channel section to allow relative movement between the tiltable juvenile vehicle seat and the seat support when the seat-motion blocker is in the extended position.

14. The child restraint of claim 13, wherein the seat-motion blocker includes a blocker body formed to include a lost-motion pivot pin slot having a first end and a second end spaced apart from the first end, the pivot pin is arranged to extend through the lost-motion pivot pin slot, the pivot pin is located toward the first end of the lost-motion pivot pin slot when the seat-motion blocker is in the retracted position, and the pivot pin is located toward the second end of the lost-motion pivot pin slot when the seat-motion blocker is in the extended position.

* * * * *